United States Patent
Foo et al.

(10) Patent No.: US 12,006,101 B2
(45) Date of Patent: Jun. 11, 2024

(54) BACK-OFF PREVENTING RESEALABLE ADHESIVES

(71) Applicant: Henkel AG & CO. KGaA, Duesseldorf (DE)

(72) Inventors: Winston Foo, Flemington, NJ (US); Alexis Kriegl, Washington, NJ (US); Christopher Wolpert, New Canaan, CT (US); Nicholas Bull, Ridgefield, CT (US); Megan Eminger, Norwalk, CT (US)

(73) Assignee: HENKEL AG & CO. KGaA, Duesseldorf (DE)

( * ) Notice: Subject to any disclaimer, the term of this patent is extended or adjusted under 35 U.S.C. 154(b) by 283 days.

(21) Appl. No.: 17/467,768

(22) Filed: Sep. 7, 2021

(65) Prior Publication Data

US 2021/0403204 A1    Dec. 30, 2021

Related U.S. Application Data

(63) Continuation of application No. PCT/US2020/024966, filed on Mar. 26, 2020.
(Continued)

(51) Int. Cl.
*B65D 41/04* (2006.01)
*B65B 7/28* (2006.01)
(Continued)

(52) U.S. Cl.
CPC ........ *B65D 41/0457* (2013.01); *B65B 7/2835* (2013.01); *B65B 7/2871* (2013.01);
(Continued)

(58) Field of Classification Search
CPC ...... B65D 1/0246; B65D 1/023; B65D 41/04; B65D 41/0457; B65D 41/0435;
(Continued)

(56) References Cited

U.S. PATENT DOCUMENTS

| 2,937,481 A | * | 5/1960 | Palmer | .................. | B29C 65/787 |
| | | | | | 219/769 |
| 4,519,859 A | | 5/1985 | Roth et al. | | |

(Continued)

FOREIGN PATENT DOCUMENTS

| CN | 201721755 U | 1/2011 |
| CN | 106469562 A | 3/2017 |

(Continued)

OTHER PUBLICATIONS

International Search Report & Written Opinion PCT/US2020/024966 Completed: Jul. 16, 2020; dated Jul. 16, 2020 12 Pages.

*Primary Examiner* — Robert J Hicks
(74) *Attorney, Agent, or Firm* — Sun Hee Lehmann

(57) ABSTRACT

Adhesive compositions that replace gaskets and liners in sealing applications for packages that are detachable with hand force are described. The adhesive compositions are particularly useful in preventing leaks and spillage during storage and transport of its packaged contents. Advantageously, the adhesive composition provides packages with (1) a removal torque of from about 4 to about 20 in-lb and (2) resealable torque on subsequent openings of from about 2 to about 15 in-lb, measured in accordance to ASTM D2063.

15 Claims, 2 Drawing Sheets

Related U.S. Application Data

(60) Provisional application No. 62/826,246, filed on Mar. 29, 2019.

(51) Int. Cl.
  *B65D 1/02* (2006.01)
  *C09J 5/00* (2006.01)
  *C09J 123/08* (2006.01)
  *C09J 131/04* (2006.01)
  *C09J 133/04* (2006.01)

(52) U.S. Cl.
  CPC .............. *B65D 1/0246* (2013.01); *C09J 5/00* (2013.01); *C09J 123/0853* (2013.01); *C09J 131/04* (2013.01); *C09J 133/04* (2013.01); C09J 2423/00 (2013.01); C09J 2431/00 (2013.01); C09J 2433/00 (2013.01)

(58) Field of Classification Search
  CPC ... B65B 7/2835; B65B 7/2871; B65B 7/2878; C09J 5/06; C09J 123/0853; C09J 123/0846; C09J 131/04; C09J 131/02; C09J 2423/00
  USPC ...... 215/44, 45, 43, 329, 316, 232; 220/293, 220/288, 359.4, 359.1; 53/478, 477
  See application file for complete search history.

(56) References Cited

U.S. PATENT DOCUMENTS

| | | | |
|---|---|---|---|
| 4,585,135 | A | 4/1986 | Sinnott |
| 5,112,554 | A | 5/1992 | Perez et al. |
| 5,779,073 | A | 7/1998 | Milhomme |
| 7,165,888 | B2 * | 1/2007 | Rodick .................. B65D 33/20 |
| | | | 383/211 |
| 9,499,311 | B1 | 11/2016 | Gilliam |
| 10,170,159 | B2 | 1/2019 | Albrecht et al. |
| 10,293,987 | B2 | 5/2019 | Sattig et al. |
| 2003/0029591 | A1 | 2/2003 | Otani et al. |
| 2003/0082371 | A1 | 5/2003 | Mazurek et al. |
| 2012/0273496 | A1* | 11/2012 | Lourido .................. C08K 3/26 |
| | | | 427/427.4 |
| 2018/0297828 | A1 | 10/2018 | Orlich et al. |

FOREIGN PATENT DOCUMENTS

| | | |
|---|---|---|
| CN | 106659634 A | 5/2017 |
| CN | 107531386 A | 1/2018 |
| JP | H04114872 A | 4/1992 |
| JP | H04351310 A | 12/1992 |
| JP | 2001315739 A | 11/2001 |
| JP | 2010514637 A | 5/2010 |
| JP | 2017110100 A | 6/2017 |
| WO | 2008082906 A2 | 7/2008 |
| WO | 2014186572 A2 | 11/2014 |
| WO | 2017068203 A1 | 4/2017 |

* cited by examiner

BACK-OFF PREVENTING RESEALABLE ADHESIVES

FIELD OF THE INVENTION

The invention relates to adhesive compositions that replace gaskets and liners in sealing container closures that are detachable by hand force. The present adhesive compositions are particularly useful in preventing back-off torques for container closures and thus, prevents leaks and spillage during storage and transport of the container contents.

BACKGROUND OF THE INVENTION

Threadlocking adhesives are typically used to prevent back-off torques and to adhesively bond and interlock engageable structural fasteners to a final state. Such threadlocking adhesives have strong adhesion and they are not detachable by hand force. Low force threadlocking adhesives are also available but once the adhesion is broken, the adhesives no longer have any cohesive force and no longer interlock.

With the rise of e-commerce, delivery of liquid and gel goods for consumers are on the rise. The containers and packages that house the liquid and/or gel goods must be leakproof and provide safe delivery of the goods.

Containers are sealed to prevent loss of their contents during storage and transport. Application torque is applied to the closure of the containers to seal the content; however, some torque is lost over time and handling, and this phenomenon is known as back-off. To compensate for this back-off torque, higher initial application torque may be applied, which can lead to damaged containers, equipment wear or prevent consumers from opening the container with mere hand force. Additional gaskets, induction seal liner, inner seal, valve seal or liners are often applied to the containers to prevent leaks; or a secondary plastic liner or foam bag liner is added to the container, increasing cost, complexity and carbon footprint of the goods. Moreover, these additional seals add more steps to the packaging process, which require several retooling (and shipping to and from) the production line, further increasing carbon footprint.

There is an ongoing need for a more sustainable solution that minimizes carbon footprint, cost and complexity, while maintaining seals to containers and packages during transport and even subsequent to opening the container. The current invention addresses this need in the art.

SUMMARY OF THE INVENTION

The invention provides a replacement for or in addition to a tape, gasket, liner or induction seal in containers and packages.

One aspect of the invention is directed to an article of manufacture comprising a first threaded member, and the threads of the threaded member is partially coated with a resealable adhesive. The resealable adhesive is a waterborne adhesive.

Another aspect of the invention provides an article of manufacture comprising the first threaded member of above, and additionally a second threaded member matingly engaged with the first threaded member, whereupon the resealable adhesive is coated between the first and the second threaded members. The resealable adhesive is a waterborne adhesive characterized as having (1) a removal torque of from about 4 to about 20 in-lb, measured in accordance to ASTM D2063; and (2) a resealability torque of from about 2 to about 15 in-lb, measured in accordance to ASTM D2063.

In another aspect, the invention provides an article of manufacture comprising a non-threaded closure member having a circumference or perimeter dimension and a height dimension. The closure member is at least partially coated with a resealable adhesive comprising a waterborne adhesive.

In a further aspect, the invention provides an article of manufacture comprising the non-threaded closure member of above and a second non-threaded member matingly engaged with the first non-threaded member, whereupon the resealable adhesive is coated between the first and the second non-threaded members. The resealable adhesive is a waterborne adhesive characterized as having (1) a removal torque of from about 4 to about 20 in-lb, measured in accordance to ASTM D2063; and (2) a resealability torque of from about 2 to about 15 in-lb, measured in accordance to ASTM D2063.

Yet another aspect of the invention provides a method of sealing threaded members comprising:
(a) providing a first threaded member;
(b) providing a second threaded member capable of matingly engaging with said first threaded member;
at least one of the said first and second threaded members being at least partially coated with a resealable coating composition; and
(c) matingly engaging said first and second threaded members.

The resealable coating composition substantially fills the matingly engaging space between the first and the second threaded members. The resealable coating composition is a waterborne adhesive characterized as having (1) a removal torque of from about 4 to about 20 in-lb, measured in accordance to ASTM D2063; and (2) a resealability torque of from about 2 to about 15 in-lb, measured in accordance to ASTM D2063.

Another aspect of the invention provides a method of sealing non-threaded members comprising:
(a) providing a first non-threaded member having a circumference or perimeter dimension and a height dimension;
(b) providing a second non-threaded member capable of matingly engaging with said first non-threaded member;
at least one of the said first and second non-threaded members being at least partially coated with a resealable coating composition; and
(c) matingly engaging said first and second non-threaded members.

The resealable coating composition substantially fills the matingly engaging space between the first and the second non-threaded members. The resealable coating composition is a waterborne adhesive characterized as having (1) a removal torque of from about 4 to about 20 in-lb, measured in accordance to ASTM D2063; and (2) a resealability torque of from about 2 to about 15 in-lb, measured in accordance to ASTM D2063.

DETAILED DESCRIPTION OF THE INVENTION

Figure 1:
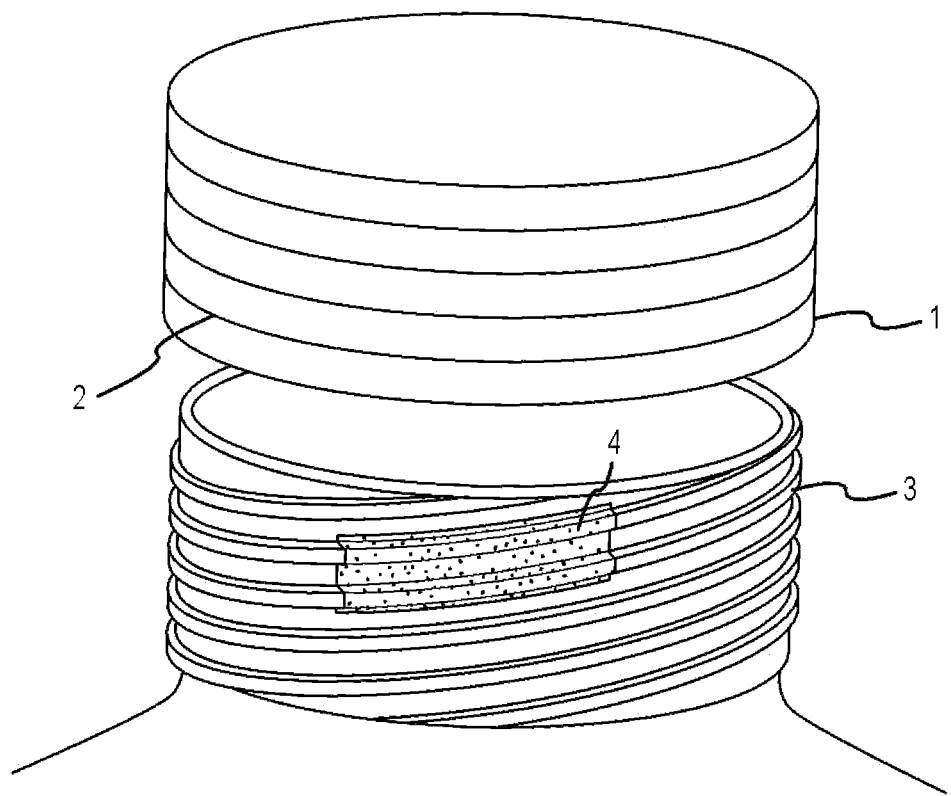
FIG. 1 is a drawing of a threaded cap and a resealable adhesive-lined threaded neck.

The present invention provides resealable adhesive-lined closure without additional device designed to seal off the opening and prevent loss of its content of a container. The resealable adhesive-lined closure is free of gaskets, induction seal liner, inner seal, valve seal or liners, which are typically made of metals, plastic, foam, paper and/or foil. The resealable adhesive-lined closures are useful for both threaded and non-threaded closures.

The term "application torque" is the torque force measured in inch-pounds, required to screw a closure onto a container.

The term "back-off" denotes relaxation of forward thrust or the loss of torque following application of the closure. This can be affected by top loading, compressibility and resiliency of the closure liner, consistency of the application torque, and mechanical interaction of the closure and bottle.

The term, "removal torque" is the amount of force necessary to loosen, open, unscrew or remove a closure from a container for the first time after closing with a specific application torque.

The term, "reapplication torque" is the amount of torque reapplied to close the container.

The term, "resealability torque" is the amount of force necessary to re-loosen, re-open, re-unscrew or remove a closure after reapplication torque was applied to the closure, which measures subsequent open torques.

The terms, "container" and "package," interchangeably used, is a medium that holds the content, and including liquid, gel and solid.

The present invention relates to adhesively fixturing matably engageable threaded and its complementary threaded members, so that the closures members are adhesively bonded and maintain a removal torque of from about 4 to about 20 in-lb, measured in accordance to ASTM D2063. Moreover, the resealable adhesive provides resealability and maintains torque on subsequent openings of from about 2 to about 15 in-lb, measured in accordance to ASTM D2063.

The present invention is also related to adhesively fixturing matably engageable non-threaded and its complementary non-threaded members with the same removal torque and resealability values as above.

The addition of the resealable adhesive locks and seals the members once application torque is applied onto the members. Such resealable adhesive significantly increases the torque required to break or turn the engaged threaded and non-threaded members of the container and provides leak and spill-proof to the containers without additional liners. A typical torque value of about 4 to about 20 in-lb allows for hand removal of the joined members. Values greater than about 20 in-lb would require additional tool to separate the members. Values less than about 2 in-lb may rupture the seal and cause contents to leak.

The resealable adhesives of the present invention have large gap-filling capabilities, are non-messy, do not drip, may be applied to container surfaces, and stored prior to use.

The resealable adhesive is a waterborne adhesive. Typically, the waterborne adhesive includes a water-based polymer or emulsion polymer. The emulsion polymer may be present in the adhesive composition in any amount, and desirably is present in an amount of from about 50% to about 99.5 wt. % by weight of the adhesive composition prior to setting of the composition. Depending on the emulsion polymer, the solid levels vary from about 50 wt. % to about 90 wt. %, based on the emulsion polymer. The emulsion polymer component may include any desired polymer components, including vinyl acetate ethylene dispersion, polyvinyl acetate, polyvinyl acetate polyvinyl alcohol, dextrin stabilized polyvinyl acetate, polyvinyl acetate copolymers, vinyl acetate ethylene copolymers, vinyl acrylic, styrene acrylic, acrylic, styrene butyl rubber, polyurethane, ethylene vinyl acetate, polyacrylic, and mixtures thereof. Particularly preferred emulsion polymer components are polyacrylics, vinyl acetate ethylene dispersion, ethylene vinyl acetate, and polyvinyl acetate.

It is understood that the waterborne adhesive may also include other compatible components, additives and/or ingredients normally found in known waterborne adhesives, such as tackifiers, humectants, preservatives, e.g., antioxidant, biocide; filler, pigment, dye, stabilizer, rheology modifier, microspheres, polyvinyl alcohol, emulsifiers, preservatives, pigments, anti-corrosion agents, water corrosion inhibiting agents, fillers, lubricating agents (such as greases, oils and waxes), defoamers, and/or coupling agents, within the skill of the art. These components can be included in an amount of from about 0.05% to about 50% by weight of the adhesive composition prior to setting of the composition.

Exemplary waterborne adhesive includes pressure sensitive adhesive, ethylene vinyl acetate-based adhesive and polyacrylic-based adhesive.

Regardless of the specific formulation, the waterborne adhesive formulation is combined to known methods in the art. The waterborne adhesive is desirably formed into paste-like in consistency with sufficient viscosity and sag-resistance to permit ready application of the adhesive to the threads and non-threads of the mateable member, without subsequent dripping, sagging or displacement of the adhesive prior to mating and locking its complementary member.

In one embodiment, the resealable adhesive may be applied onto the surface of one of the closure members. The resealable adhesive may be applied in any suitable manner, such as for example by extrusion, spraying, dipping, roller coating, contact coating or in any other suitable manner, depending on the thickness, flow and viscosity characteristics desired or present in the specific end use application of the composition. The resealable adhesive is preapplied in a set amount onto the surface area (coating weight in a specified area) of a member to be engaged with complementary mating member, and such preapplied medium may then be dried, depending on the type of the resealable adhesive in any suitable manner, e.g., by ambient (room temperature) or by elevated temperature drying conditions effective for drying of the coated material for waterborne adhesive. With the evaporation of water and curing, the adhesive is then dried and cured to a lower thickness than the applied thickness.

In another embodiment, a set amount of the resealable adhesive may be preapplied onto the surface area of a member to be engaged with complementary mating member, and before the adhesive dried and set, a second member is engaged. The adhesive in the engaged members are then dried and cured in any suitable manner, e.g., by ambient (room temperature) or by elevated temperature drying conditions effective for drying of the coated material for waterborne adhesive.

Uniform thickness of the resealable adhesive at the closure member is desirable; however, nonuniform thickness can become more uniform under application force, where mating the two members will squeeze the resealable adhesive together to form a desirable seal.

As shown in FIG. 1, resealable adhesive (4) is applied onto an area (3) of the threaded neck. The neck member matingly engages onto the threads (2) of the cap (1).

Figure 2:
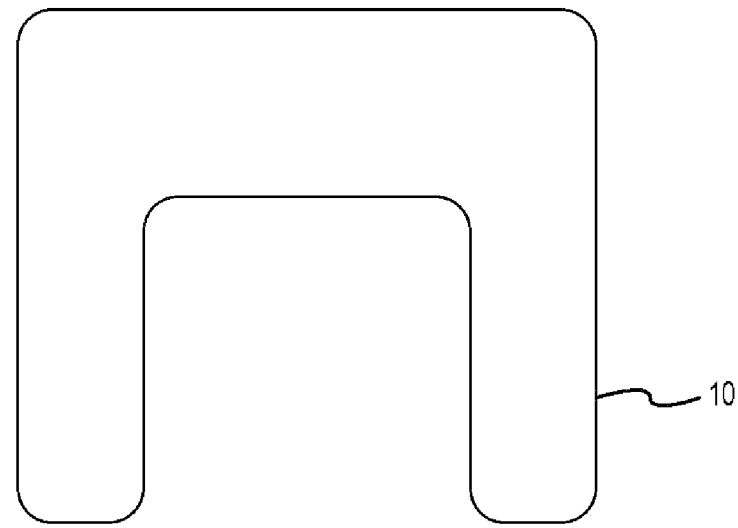
FIG. 2 is a drawing of a non-threaded cap and a resealable adhesive-lined non-threaded neck.
Figure 2:
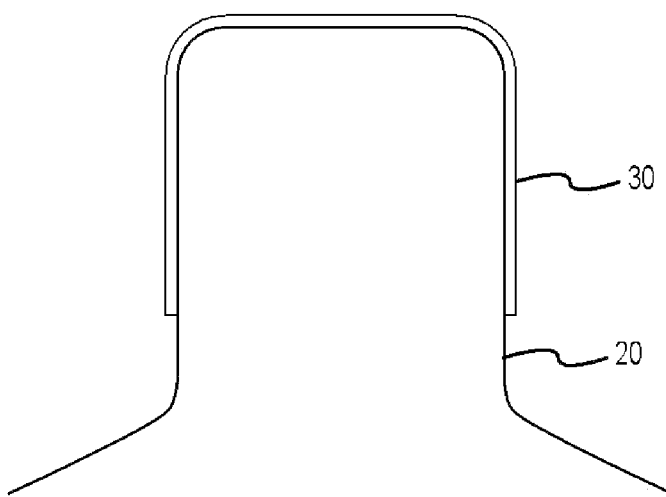

Also as shown in FIG. 2, resealable adhesive (30) is applied onto the neck (20). The neck fits matingly onto the cap (10).

Once applied to one of the members, the resealable adhesive remains on the surface of the threaded or the non-threaded member until mated to its complementary member. In use, the member with the preapplied resealable adhesive thereon is contacted with mating surface of the complementarily member, which optimally may have resealable adhesive previously applied to the surface of the complementary member thereof, to facilitate the fixation of the engaged member. In such manner, a differential pressure is applied to the matably engaged members.

Surprisingly, the removal torque is independent of the thickness of the resealable adhesive in the engaged members, the coating ranges from about 0.001 $g/in^2$ to about 1 $g/in^2$, preferably from about 0.02 $g/in^2$ to about 0.5 $g/in^2$. The resealable adhesive is self-regulating and provides optimal removal torque range of from about 4 to about 20 in-lb when the dried and set, and a resealability torque is in the range of 2 to about 15 in-lb. The resealable adhesive also retains about 40 to 100% of the reapplied torque, and back-off torque loss is not significant.

In some embodiment, the resealable adhesive is clear or milky-white. In other embodiment, pigment is added to tint or dye the color of the resealable adhesive to match the container color.

In another embodiment, the invention is a method for adhesively bonding threaded or non-threaded member, by the steps of:
  (a) providing a first threaded or non-threaded member;
  (b) providing a second threaded or non-threaded member capable of matingly engaging with said first member; at least one of the said first and second members being at least partially coated with a resealable coating composition; and
  (c) matingly engaging said first and second threaded members.

The resealable coating composition substantially fills the matingly engaging space between the first and the second members. The resealable coating composition is a waterborne adhesive characterized as having a removal torque of (1) from about 4 to about 20 in-lb, measured in accordance to ASTM D2063; and (2) resealability torque of from about 2 to about 15 in-lb, measured in accordance to ASTM D2063.

The present invention may be used in place of or in addition to bags, tapes, films, strips, gaskets, pads, strings, and various other shaped pieces, which may be applied to container closure members.

The container closure members with which the invention may be carried out includes any structural elements, e.g., cap and closure, screw tops, snap fastener elements, tongue-and-groove fastener elements, hook-and-loop fastener elements, press-fit elements, pump dispensers, etc., which are adhesively bondably engageable with a complementary mating structure. The closure member and complementary member may thus comprise a cap and closure assembly, which are threadably or non-threadably engaged and have the resealable adhesive filled in the gap between the matingly engaged members.

The present invention is useful as caps, lid, and closures, and may be formed as container (bottle) necks, screw caps, roll on Pilfer proof closures, security closures, dispensing and dosing closure, trigger spray closure, security closures, valve closures, tube caps, tamper evident closures, sports caps, snap hinge caps, screw caps, push pull closures, pours and dropper closures, child resistant closures, and the like.

The above caps and closures are typically made from polypropylene, polyethylene, high density polyethylene, low density polyethylene, polyvinyl chloride and/or polyethylene terephthalate.

EXAMPLES

All torque values were measured by Mark 10, model MTT 01-50 in accordance with ASTM D2063.

Example 1

Sample polyacrylic based pressure sensitive adhesive, having a solids contents of about 66%, and viscosity of 900-1000 cP and pH of 4.5, was used as resealable adhesive.

Various coating weight (in grams per inch square) of the sample adhesive, was applied onto a first threaded member and then dried and cured.

At least 3 threaded members were conditioned at room temperature (21-25° C.), for 24 hours and each member was threaded to its mateable second threaded member by hand (application force). The mated members were then tested for removal torque and recorded in Table 1.

Once removed, each were reclosed with specified re-application torque, and tested for resealability torque. The resealability torques values and the percent retained torque are also listed in Table 1.

TABLE 1

| Coating weight ($g/in^2$) | Removal torque (lb-in) | Re-application torque (lb-in) | Resealability torque (lb-in) | % retained torque (%) |
| --- | --- | --- | --- | --- |
| 0.058 | 8.66 | 11.7 | 9.35 | 80 |
| 0.070 | 6.52 | 13.0 | 7.50 | 58 |
| 0.012 | NA | 11.8 | 6.87 | 42 |
| 0.291 | 6.06 | 11.8 | 10.3 | 88 |

Coating weights of the first three samples allowed for removal torque and resealability torque within hand openability ranges. The above examples demonstrated the removal and resealability torque values were somewhat independent of the coating weight when the adhesive is a waterborne adhesive. Also, the resealable adhesive retained torque of greater than about 42%.

Example 2

A hot melt adhesive [ethylene vinyl acetate polymer (30 wt. %), tackifier (60%), wax (8%) and additives (2%)], with various coating weights were tested for its corresponding torque values, and the results are shown in Table 2.

TABLE 2

| Coating weight ($g/in^2$) | Removal torque (lb-in) | Re-application torque (lb-in) | Resealability torque (lb-in) | % retained torque (%) |
| --- | --- | --- | --- | --- |
| 0.058 | 7.7 | 11.5 | 5.4 | 47 |
| 0.268 | 32.2 | NA | NA | NA |

As demonstrated above, the coating weight for a hot melt adhesive directly affects removal torque. Unlike waterborne adhesive, application of hot melt adhesive coating weight at 0.268 g/in$^2$ increased the removal torque to outside hand openability.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. An article of manufacture comprising
a first threaded member, and
a second threaded member, matingly engaged with said first threaded member,
wherein the threads of said first threaded member are at least partially coated with a resealable adhesive comprising a waterborne adhesive; and
wherein the resealable adhesive is characterized as having (1) a removal torque of from about 4 to about 20 in-lb, measured in accordance to ASTM D2063, and (2) a resealability torque of from about 2 to about 15 in-lb, measured in accordance to ASTM D2063.

2. The article of manufacture of claim 1, wherein the waterborne adhesive comprises a pressure sensitive adhesive, ethylene vinyl acetate-based adhesive or polyacrylic-based adhesive.

3. The article of manufacture of claim 1, wherein the first or the second threaded member is independently made of polypropylene, polyethylene, high density polyethylene, low density polyethylene, polyvinyl chloride or polyethylene terephthalate.

4. The article of manufacture of claim 1, wherein the first threaded member is a cap, lid or closure.

5. The article of manufacture of claim 1, wherein the first threaded member is a container neck or bottle neck.

6. An article of manufacture comprising a non-threaded closure member having an area of a circumference or perimeter dimension and a height dimension,
wherein the area of the closure member is at least partially coated with a resealable adhesive comprising a waterborne adhesive, further comprising a second non-threaded member matingly engaged with the area of said first non-threaded member, whereupon the resealable adhesive is coated between the first and the second non-threaded members; wherein the resealable adhesive is characterized as having a removal torque of from about 4 to about 20 in-lb, measured in accordance to ASTM D2063; wherein the threaded member has a resealability torque of from about 2 to about 15 in-lb, measured in accordance to ASTM D2063.

7. The article of manufacture of claim 6, wherein the waterborne adhesive comprises a pressure sensitive adhesive, ethylene vinyl acetate-based adhesive or polyacrylic-based adhesive.

8. The article of manufacture of claim 6, wherein the first or the second non-threaded member is independently made of polypropylene, polyethylene, high density polyethylene, low density polyethylene, polyvinyl chloride or polyethylene terephthalate.

9. The article of manufacture of claim 6, wherein the first non-threaded member is a cap, lid or closure.

10. The article of manufacture of claim 6, wherein the first non-threaded member is a container neck or bottle neck.

11. A method of sealing members comprising:
(a) providing a first member;
(b) providing a second member capable of matingly engaging with said first member; at least one of the said first and second members being at least partially coated with a resealable coating composition;
(c) matingly engaging said first and second members;
whereupon the reseable coating composition substantially fills the matingly engaging space between the first and the second members;
wherein the resealable coating composition is a waterborne adhesive characterized as having a removal torque of from about 4 to about 20 in-lb, measured in accordance to ASTM D2063;
wherein the resealable adhesive has a resealability torque of from about 2 to about 15 in-lb, measured in accordance to ASTM D2063.

12. The method of sealing members of claim 11, wherein the first or the second member is independently made of polypropylene, polyethylene, high density polyethylene, low density polyethylene, polyvinyl chloride or polyethylene terephthalate.

13. The method of sealing members of claim 11, wherein at least one of the said first and second members is a cap, lid or closure.

14. The method of sealing members of claim 11, wherein the first and the second members are threaded members.

15. The method of sealing members of claim 11, where in the first and the second members are non-threaded members.

* * * * *